(12) United States Patent
Forwerck et al.

(10) Patent No.: US 10,203,228 B2
(45) Date of Patent: Feb. 12, 2019

(54) CRASH SENSOR ASSEMBLY

(71) Applicants: Veoneer US, Inc., Southfiled, MI (US); Analog Devices, Inc., Norwood, MA (US)

(72) Inventors: Joshua Forwerck, Royal Oak, MI (US); Mark Caron, Warren, MI (US); Harvey Weinberg, Sharon, MA (US)

(73) Assignee: VEONEER US, INC., Southfield, MI (US)

( * ) Notice: Subject to any disclaimer, the term of this patent is extended or adjusted under 35 U.S.C. 154(b) by 131 days.

(21) Appl. No.: 15/215,224

(22) Filed: Jul. 20, 2016

(65) Prior Publication Data

US 2018/0023981 A1 Jan. 25, 2018

(51) Int. Cl.
*G01D 11/24* (2006.01)
*B60R 16/023* (2006.01)
*G01D 11/30* (2006.01)
*B60R 21/01* (2006.01)

(52) U.S. Cl.
CPC ........ *G01D 11/245* (2013.01); *B60R 16/0231* (2013.01); *G01D 11/30* (2013.01); *B60R 2021/01006* (2013.01)

(58) Field of Classification Search
CPC . G01P 1/02; G01P 1/023; G01P 1/026; G01D 11/245; G01D 11/30; B60R 16/0231; B60R 16/0232; B60R 21/01; B60R 2021/01006; B60R 2021/01013; B60R 21/013; B60R 21/0132; B60R 21/0136
USPC ........................................................ 73/866.5
See application file for complete search history.

(56) References Cited

U.S. PATENT DOCUMENTS

| | | | | |
|---|---|---|---|---|
| 5,297,976 A | * | 3/1994 | VanDerStuyf | H01R 13/5219 439/271 |
| 5,309,143 A | * | 5/1994 | Brown | B60Q 11/007 340/457 |
| 5,745,347 A | * | 4/1998 | Miller | B60R 21/01 361/807 |
| 5,996,408 A | * | 12/1999 | TenBrink | G01P 1/026 310/168 |
| 7,819,004 B2 | | 10/2010 | Steele et al. | |
| 8,062,055 B2 | | 11/2011 | Myer et al. | |
| 8,118,620 B2 | | 2/2012 | Al-Ali et al. | |

(Continued)

OTHER PUBLICATIONS

International Search Report and Written Opinion of the International Searching Authority of PCT/US2017/28277 dated Jul. 17, 2017.

*Primary Examiner* — Benjamin R Schmitt
(74) *Attorney, Agent, or Firm* — Brinks Gilson & Lione

(57) ABSTRACT

A sensor assembly specially adapted for use as a crash sensor for motor vehicle applications. The sensor assembly includes a connector housing assembly and a separate sensor element. The sensor element is formed with a pair of spade type terminals. The sensor element is received by a passageway within the housing assembly which further incorporates receiving terminals connected with electrical pigtail wires. The assembly housing incorporates features for secure mounting of the unit to a vehicle or other device, and provide accurate location when needed for directional sensing. The unit provides a snapfit assembly of the sensor element and includes features for preventing improper assembly of the unit and provides a desired mechanical connection between the sensor element and the associated vehicle.

17 Claims, 3 Drawing Sheets

(56) References Cited

U.S. PATENT DOCUMENTS

| | | |
|---|---|---|
| 8,234,034 B2 | 7/2012 | Grisighella, Jr. et al. |
| 8,545,234 B2 | 10/2013 | Szczesny et al. |
| 8,641,319 B2 | 2/2014 | Vichinsky |
| 8,796,572 B2 | 8/2014 | Hiraoka et al. |
| 8,966,975 B2 | 3/2015 | Campbell et al. |
| 8,982,578 B2 | 3/2015 | Bryan et al. |
| 9,235,937 B1 | 1/2016 | Weinberg |
| 9,577,389 B2 | 2/2017 | Dicks et al. |
| 2009/0099423 A1 | 4/2009 | Al-Ali et al. |
| 2009/0137163 A1 | 5/2009 | Schoettle |
| 2010/0317219 A1 | 12/2010 | Myer et al. |
| 2012/0094509 A1 | 4/2012 | Bryan et al. |
| 2013/0109202 A1 | 5/2013 | Szczesny et al. |
| 2014/0165727 A1* | 6/2014 | Mueller ............ G01D 11/245 73/514.39 |
| 2015/0255923 A1 | 9/2015 | Xu et al. |
| 2015/0255932 A1 | 9/2015 | Dicks et al. |
| 2016/0139168 A1 | 5/2016 | Ludwig et al. |

\* cited by examiner ial holder which receives sensor assembly 10. Through the combination of mounting fastener 52 engaged with mounting bore 48 and locator feature 54 engaged with aperture 56, sensor assembly 10 is secured and precisely positioned relative to the vehicle body or other structure to which it is attached.

CRASH SENSOR ASSEMBLY

FIELD OF THE INVENTION

The invention relates to a sensor assembly particularly adapted for kinematic sensors such as crash sensors of the type used in motor vehicles and other devices.

BACKGROUND

Motor vehicles today have increasingly sophisticated safety systems of the active and passive type. Active type safety systems typically use restraint systems such as inflatable restraint systems, in the form of frontal impact airbags and side curtain airbags, among others. Numerous additional types of countermeasures are employed today to enhance vehicle safety which may influence the vehicle steering or braking system or in some manner ready safety systems for the potential for activation. These systems require the use of a vehicle kinematic sensor such as a crash sensor. Crash sensors are employed to detect high magnitude accelerations acting on the vehicle for activating the previously mentioned safety systems. Kinematic sensors are also used to detect lower magnitude accelerations as part of vehicle dynamics control and collision avoidance systems.

Crash sensor devices today typically have many subcomponents and are generally based on a housing which contains a sensor that is soldered to an internal circuit board having discrete components. The housing has a formed internal cavity which receives the circuit board assembly. After assembly and installation of the circuit board assembly, the housing is generally sealed using potting or a laser welded cover. The housing provides mounting and locating features that allows for assembly to the vehicle and a connector interfaces provided for electrical connection to a vehicle connector and harness. These systems typically employ a male plug as part of the vehicle bus which is snapped into a receptacle cavity in the sensor housing. While such presently available systems are very effective, manufacturers and designers of motor vehicle components continuously strive to reduce their cost, number of parts, and complexity, and improve manufacturability while providing the necessary extremely high level of reliability and function, particularly important in safety-related systems and components.

The crash sensor assembly in accordance with the present invention uses what is described as a fuse style sensor element. The sensor element may be provided by a sensor supplier having a configuration resembling widely used automotive current limiting fuses, with a pair of aligned spade male terminals. A connector and housing assembly includes features for receiving the sensor element, and enabling it to be mounted to the vehicle and precisely positioned relative to the vehicle body and frame. The system of the present invention significantly reduces the number of discrete components needed to form the sensor assembly. The system also enables a reduced overall package size.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION

Figure 1:
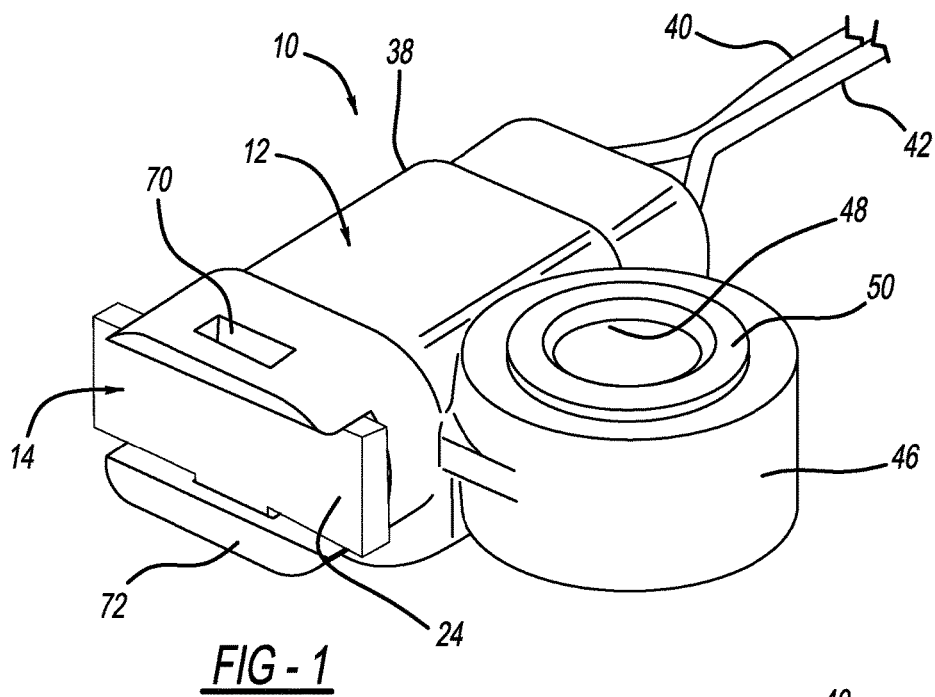
FIG. 1 is an isometric view of the sensor assembly in accordance with the present invention.
Figure 2:
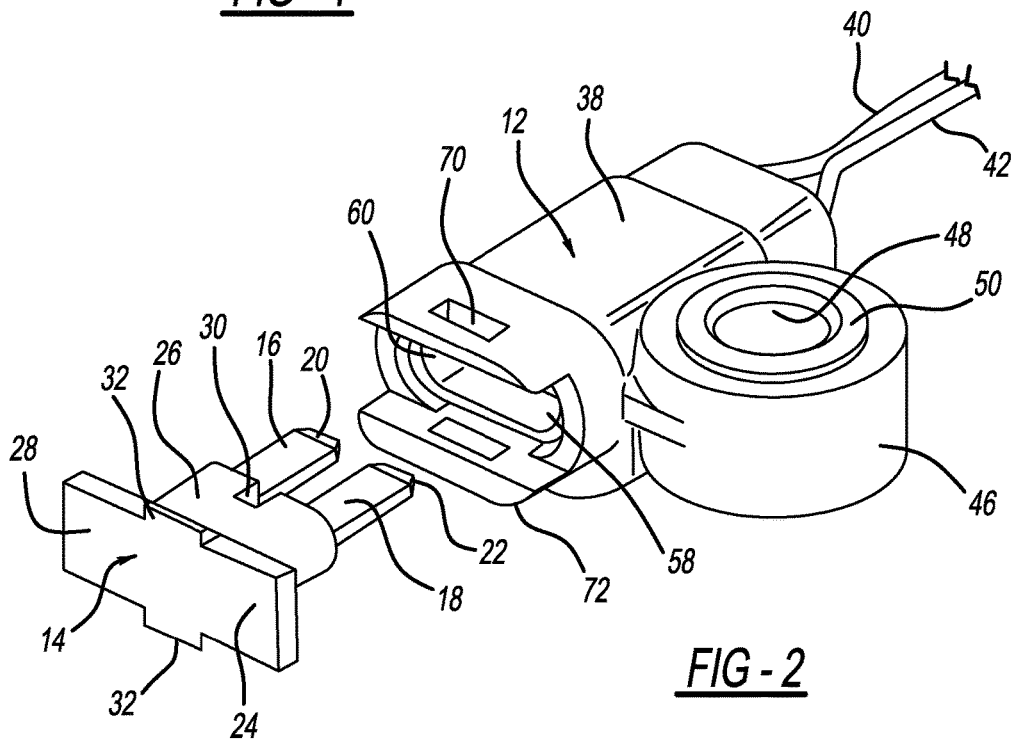
FIG. 2 is an exploded isometric view of the sensor assembly shown with the sensor element displaced from connection with the connector housing assembly.

Each of the figures illustrate the primary components of sensor assembly 10, generally consisting of connector housing assembly 12 and sensor element 14.

Sensor element 14 includes internal elements provided for a sensing function (not shown). For example, sensor element 14 may be responsive to an inertial variable such as acceleration or to some other physical or environmental factors such as pressure or temperature. Sensor element 14 is formed in a configuration very similar to typical modern current limiting fuses found in motor vehicles around the world. Those elements, like sensor assembly 14 have a pair of flat spade type terminals 16 and 18 which have a rectangular (flat) cross-sectional shape and are aligned such that their major surfaces lie on the same plane. To ease insertion into an appropriate receiving socket, terminals 16 and 18 have tapered or pointed proximal ends 20 and 22. Sensor element 14 is preferably formed into a molded body 24 which includes an insertion portion 26 and a flat plate-like end 28. Terminals 16 and 18, and body 24 cooperate with features of connector housing assembly 12 which will be described in more detail as follows. Importantly, a feature such as notch 30 in insertion portion 26 is provided to ensure that sensor element 14 may only be received by connector and housing assembly 12 in a predetermined indexed orientation. Protruding tabs 32 interact with features of housing 38 to lock in the sensor element after assembly. Sensor assembly 14 can be provided in various form factors such as similar to current limiting fuses which utilize a 2.8 mm fuse blade. Designs of sensor assembly 10 will incorporate features which prevent the insertion of current limiting fuses into connector housing assembly 12 which would defeat the function of sensor assembly 10.

Figure 3:
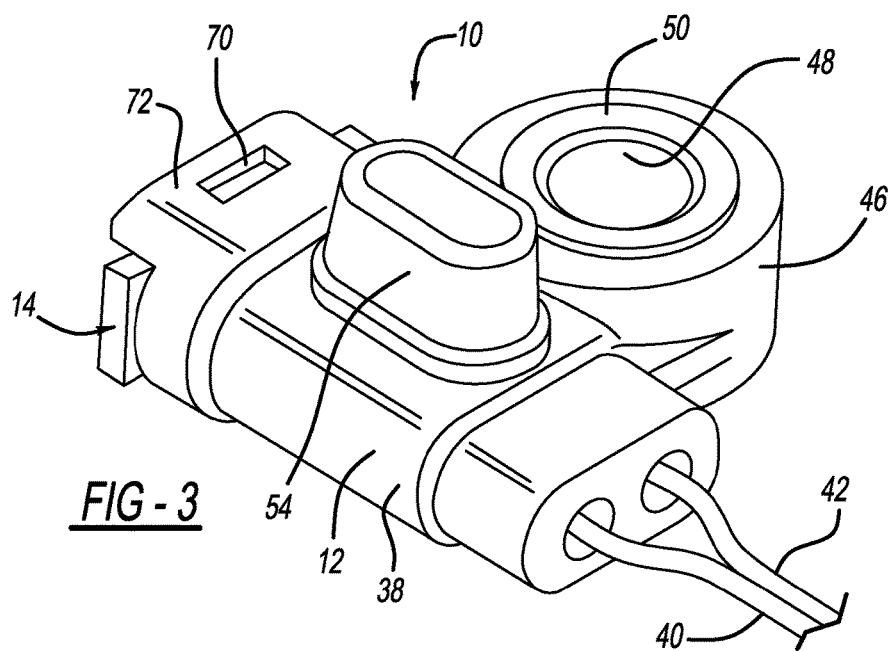
FIG. 3 is an isometric view of the sensor assembly viewing the bottom surface of the assembly.

Connector housing assembly 12 is a composite structure primarily formed of a molded resin material. A pair of female spade terminal sockets 34 and 36 is provided to receive and mate with terminals 16 and 18. Preferably spade terminal sockets 34 and 36 are received by corresponding internal cavities of housing 38 which receive the sockets and lock them in position. Pigtail wires 40 and 42 are connected with spade socket terminals 34 and 36 respectively, and a pair of grommets 44 is provided for environmental sealing around the wires. Housing 38 further forms mounting boss 46 forming internal mounting bore 48 provided to receive a suitable mechanical fastener 52 for secure mounting of sensor assembly 10 to an associated vehicle or structure. Preferably mounting bore 48 is formed by a metal compression limiting bushing 50 which is provided such that a compression force imposed by mounting fastener 52 will not impose excessive compressive forces on the resin material of housing 38 which could lead to mechanical failure or deformation. Locator feature 54, particularly evident with reference to FIG. 3, is provided to be received by a suitable aperture 56 which is provided at the associated mount position for sensor assembly 10. The combination of locator feature 56 and mounting bore 48 ensure that sensor assembly 10 is mounted to the vehicle or apparatus in a secure manner and oriented in a desired position, especially important for him where sensor element 14 measures kinematic features where direction of accelerations are important.

Figure 6:
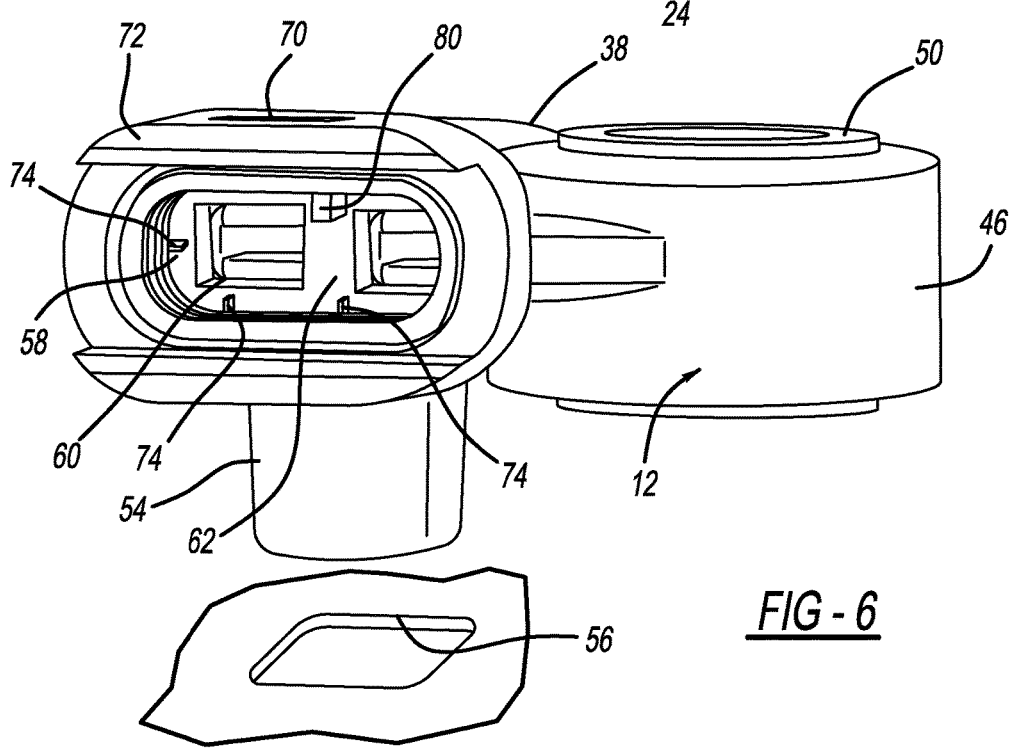
FIG. 6 is an end view of the sensor assembly.

Connector housing 38 further forms an internal cavity 58 with an open receiving end 60 and a blind opposite closed end 62 ending at spade terminal sockets 34 and 36. As best shown in FIG. 6, internal cavity 58 has a shape which corresponds with and closely receives sensor element insertion portion 26. Since sensor assembly 10 is provided for kinematic sensing it is important that sensor element 14 is securely located within housing internal cavity 58 and that it is mechanically coupled to the housing for reliable sensing of accelerations acting on the associated vehicle or apparatus. As shown in FIG. 6, a series of crush ribs 74 may be provided which protrude slightly into an interference condition with the inserted sensor element 14. Crush ribs 74 are configured to abrade or compress against sensor element insertion portion 26 to provide the previously mentioned rigid mechanical connection between the components.

Figure 4:
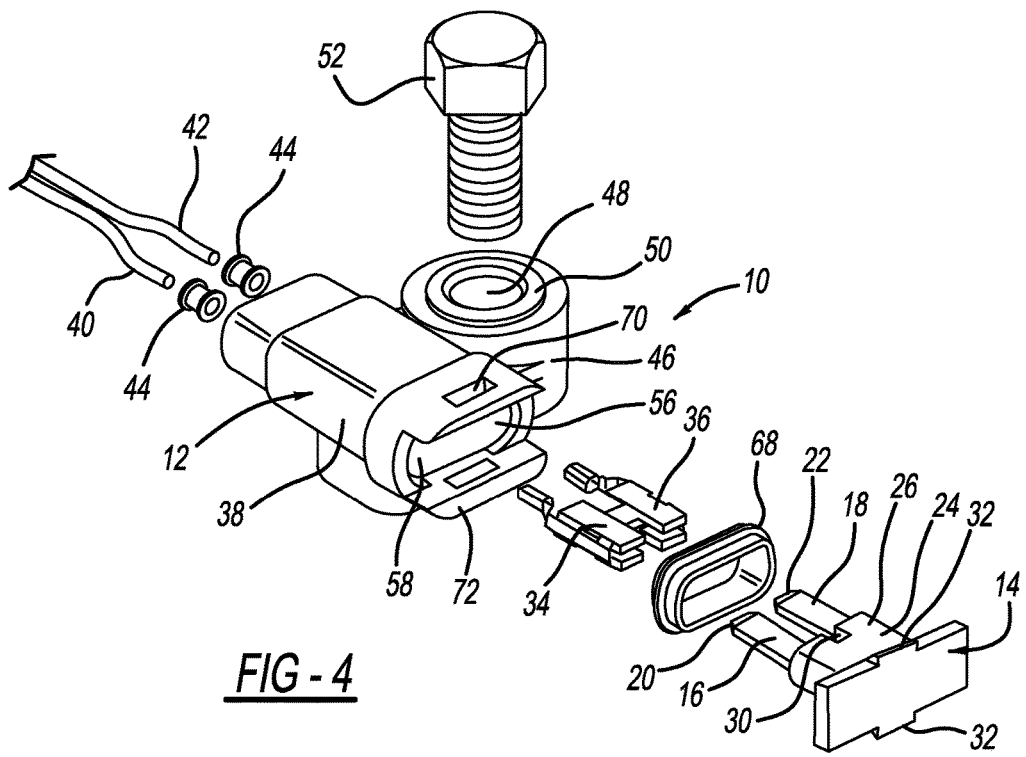
FIG. 4 is an exploded view showing each of the individual elements and exploded positions.
Figure 5:
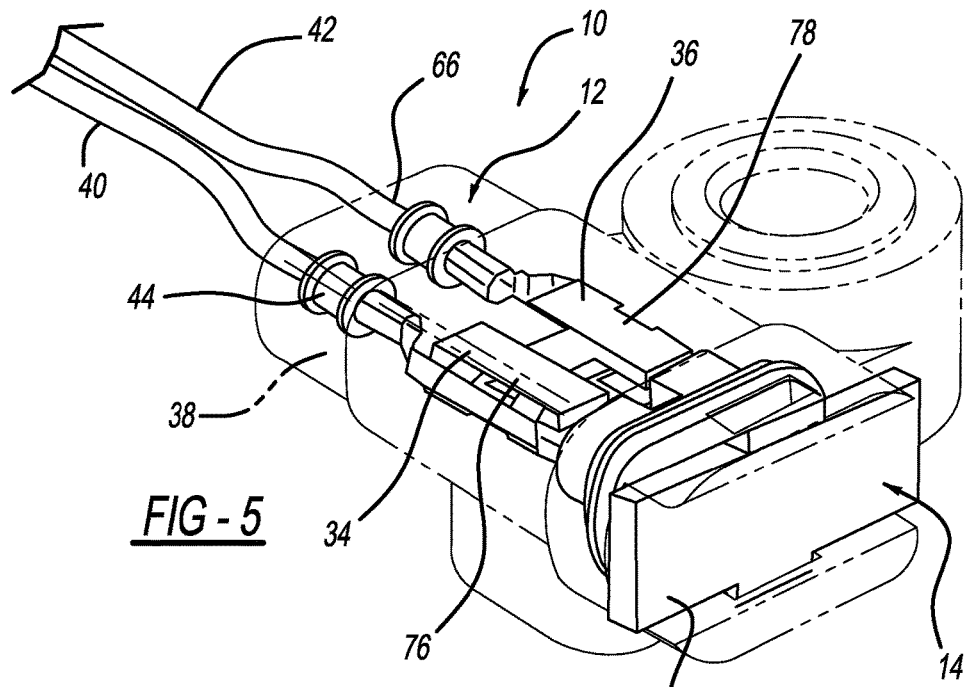
FIG. 5 is a pictorial view of the assembly showing the housing in phantom lines thereby showing the internal components in greater detail.

FIG. 4 provides an exploded view of the individual components of sensor assembly 10. Connector assembly housing 38 is first formed preferably with insert molded compression limiting bushing 50. Wires 40 and 42 are inserted through wire receiving passages 64 and 66 and are passed through grommets 44. Bared ends of wires 40 and 42 are crimped into connection with spade terminal sockets 34 and 36. Next, sockets 34 and 36 are inserted and preferably snapfit into receiving cavities 76 and 78 formed by housing 38. The subassembly shown in FIG. 6 is thereby formed. FIG. 4 shows sensor element 14 inserted into internal cavity receiving end 60. Sealing gasket 68 is provided to create an environmental seal. As mentioned previously, features are provided which prevent sensor element 14 from being inserted in a 180° indexed position, for example through the use of notch 30 and a corresponding mating protrusion 80 within internal cavity 58, best shown with reference to FIG. 6. The protruding tabs 32 of sensor element 14 are received by associated apertures or notches 70 formed in housing extending wings 72 which provide snapfit assembly of the unit in its final assembled form.

If needed for servicing, sensor element 14 can be removed and replaced by deflecting wings 72, releasing tabs 32 from apertures 70.

While the above description constitutes the preferred embodiment of the present invention, it will be appreciated that the invention is susceptible to modification, variation and change without departing from the proper scope and fair meaning of the accompanying claims.

The invention claimed is:

1. A sensor assembly adapted to be affixed to a structure comprising;
    a connector housing assembly having a housing with a locator feature for enabling the housing to be mounted in a predetermined orientation to the structure, at least two electrical conductive elements extending from the housing and connected to at least two female electrical terminal sockets within the housing, the connector housing forming an open internal cavity, and
    a sensor element having an internal sensing component, a body, and at least two male connectors configured to mate with the female electrical terminal sockets, the sensor body configured to be received by the connector housing open internal cavity and retained within the open internal cavity with the male connectors and the female electrical terminal sockets in a mating engagement, the sensor element received by the open internal cavity in an interference fit manner.

2. The sensor assembly in accordance with claim 1 further comprising, the locator feature interfitting with a cooperating feature of the structure to provide the predetermined orientation.

3. The sensor assembly in accordance with claim 1 further comprising the housing further forming a mounting bore for receiving a fastener adapted to mount the sensor assembly to the structure.

4. The sensor assembly in accordance with claim 3 further comprising the housing having a compression limiter to restrain compressive loads arising between the fastener and the structure.

5. The sensor assembly in accordance with claim 1 further comprising the housing open internal cavity forming an opening at an end of the cavity and the female electrical terminal sockets positioned at an opposite end of the cavity.

6. The sensor assembly in accordance with claim 1 further comprising the housing formed of a molded resin material and the electrical conductive elements received within a passageway formed in the housing.

7. The sensor assembly in accordance with claim 1 further comprising the electrical conductive elements in the form of wires connected with the female electrical terminal sockets.

8. The sensor assembly in accordance with claim 1 further comprising the internal sensing component in the form of an inertial sensitive element.

9. The sensor assembly in accordance with claim 1 further comprising the connector housing assembly and the sensor element cooperating to enable the sensor element to be removeably attached to the connector housing assembly.

10. The sensor assembly in accordance with claim 1 further comprising a first cooperating feature formed by the housing and a second cooperating feature formed by the sensor element to enable the sensor element to be received by the internal cavity only in a desired orientation.

11. The sensor assembly in accordance with claim 1 further comprising a first cooperating feature formed by the housing and a second cooperating feature formed by the sensor element the first and second cooperating features providing the interference fit.

12. The sensor assembly in accordance with claim 11 further comprising at least one of the first and second cooperating features in the form of crush ribs.

13. The sensor assembly in accordance with claim 1 further comprising a seal interposed between the housing and the sensor element to seal the connection between the male connectors and the female electrical terminal sockets.

14. The sensor assembly in accordance with claim 1 further comprising a seal interposed between the housing and the sensor element to seal the connection between the male connectors and the female electrical terminal sockets.

15. The sensor assembly in accordance with claim 14 further comprising the spade lugs being flat and aligned on a plane.

16. The sensor assembly in accordance with claim 1 further comprising wherein the sensor element is adapted to be affixed to and removed from the connector housing when the assembly is mounted to the structure.

17. A sensor assembly adapted to be affixed to a structure comprising;
    a connector housing assembly having a housing with a locator feature for enabling the housing to be mounted in a predetermined orientation to the structure, at least two electrical wires extending from the housing and connected to at least two female electrical terminal sockets within the housing, the connector housing forming an open internal cavity forming an opening at an end of the cavity and the female electrical terminal sockets positioned at an opposite end of the open internal cavity, and a sensor element having an internal sensing component, a body, and at least two male connectors configured to mate with the female electrical terminal sockets, the sensor body configured to be received by the connector housing open internal cavity and retained within the open internal cavity with the male connectors and the female electrical terminal sockets in a mating engagement, the sensor element received by the open internal cavity in an interference fit manner, the connector housing assembly and the sensor element cooperating to enable the sensor element to be removably attached to the connector housing assembly.

\* \* \* \* \*